(No Model.) 3 Sheets—Sheet 3.
T. G. MORSE.
METAL TURNING LATHE.
No. 246,903. Patented Sept. 13, 1881.
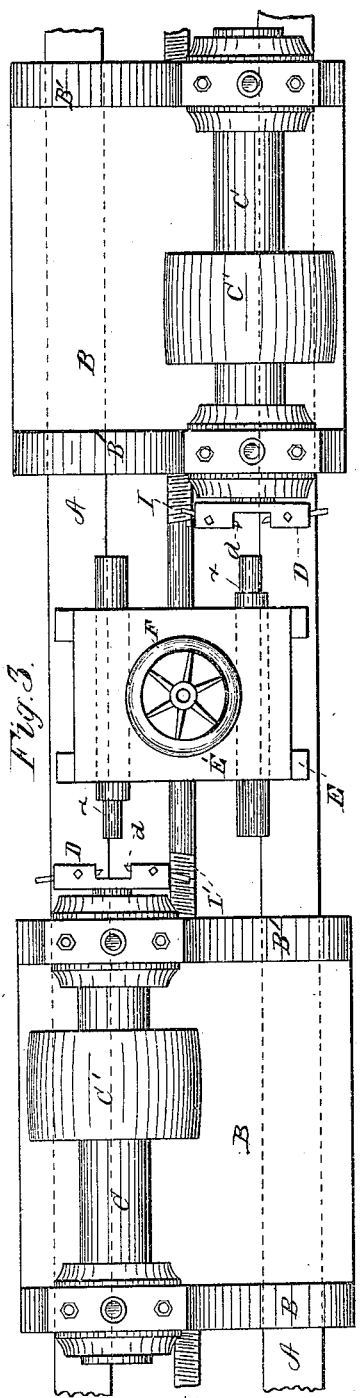
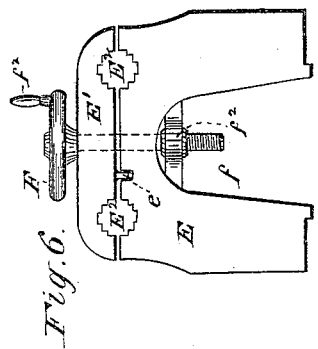
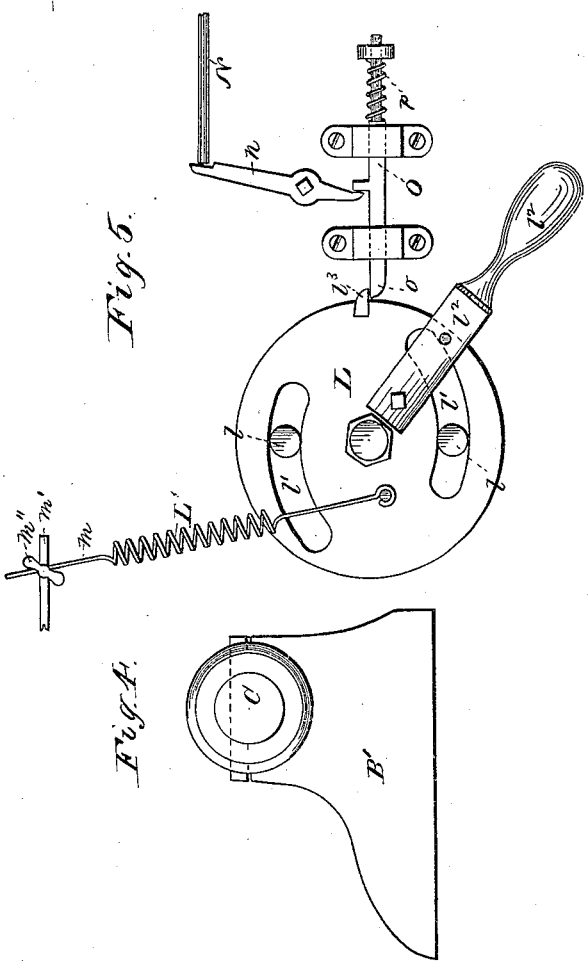
Witnesses
W. R. Edelen.
J. H. Stonemetz
Inventor.
Thos. G. Morse
Per Hallock & Hallock
Attys.

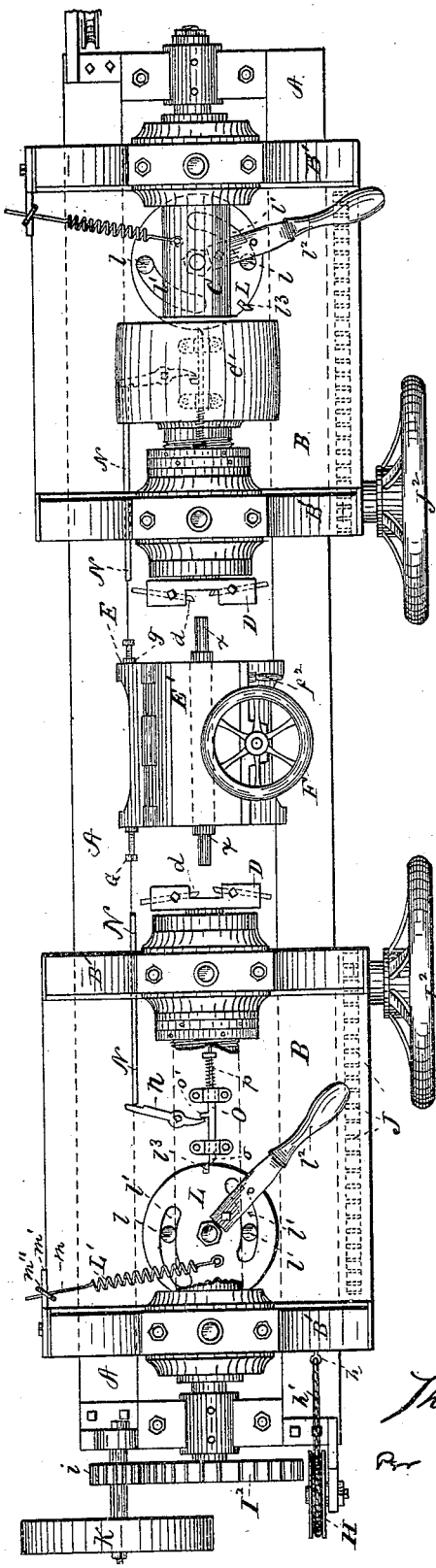

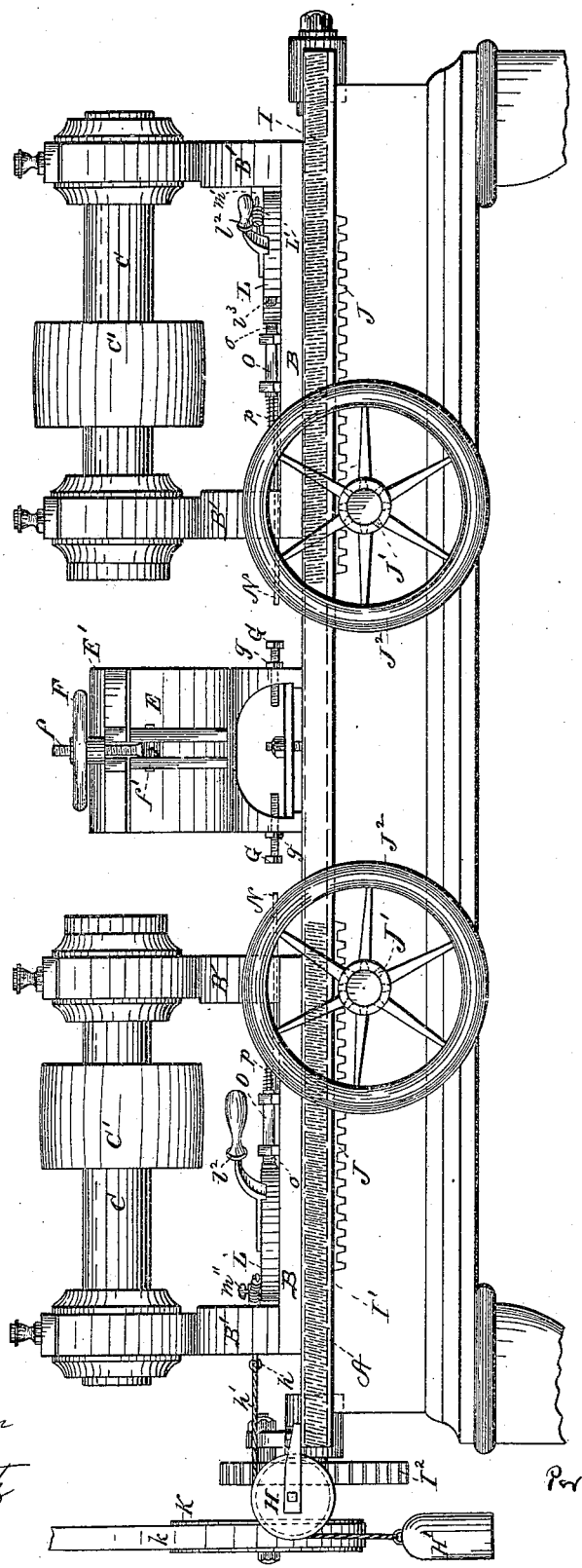

UNITED STATES PATENT OFFICE.

THOMAS G. MORSE, OF ERIE, PENNSYLVANIA.

METAL-TURNING LATHE.

SPECIFICATION forming part of Letters Patent No. 246,903, dated September 13, 1881.

Application filed April 16, 1881. (No model.)

*To all whom it may concern:*

Be it known that I, THOMAS G. MORSE, a resident of Erie, Erie county, Pennsylvania, and a citizen of the United States, have invented new and useful Improvements in Iron-Turning Hollow-Cutter-Head Lathes; and I do hereby declare that the following is a full, clear, and exact description thereof, reference being had to the accompanying drawings and the letters or figures of reference marked thereon.

My invention relates to hollow-cutter-head lathes for turning iron; and it consists in providing such improvements thereon as are hereinafter described and specifically pointed out.

Figure 1 in the accompanying drawings is a plan view. Fig. 2 is a side elevation. Fig. 3 is a view like Fig. 1, showing a modified construction. Figs. 4, 5, and 6 are details of construction, and will be fully explained hereinafter.

The device shown in the drawings is intended for use in turning the shafts of clothes-wringer rollers; but it may be used for turning various kinds of shafts, bolts, rods, axles, &c.

When a machine is designed for working on other objects than wringer-roll shafts slight modifications in the clamp and clamp-head may be required; but they will be such as will readily suggest themselves to a skilled mechanic.

The device shown in the drawings is a double-headed hollow-cutter-head lathe, and will turn both ends of a shaft at once. In the modified construction shown in Fig. 3 the two hollow cutter-heads are not opposite each other, and so do not turn both ends of a shaft, but the opposite ends of two shafts lying parallel. In this latter construction, besides the difference just named, the clamp for holding the shafts is of a different construction, to adapt it better to the work, but in all other respects the two forms—that in Figs. 1 and 2 and that in Fig. 3—are alike.

The following description will enable others to construct and use my device.

A is the bed-piece or frame of the machine. B B are the carriages, and B' B' B' B' the blocks, in which are the journal-bearings for the spindles C C. C' C' are the belt-pulleys. D D are the hollow cutter-heads. E is the clamping-block, and E' the movable part or cap of the clamp. F is the screw hand-wheel for operating the clamp. X is the shaft in position for being turned.

The carriages are advanced by a screw-shaft, I I', operated by the gearing K $i$ I$^2$.

The nuts on the carriages are common bifurcated nuts used in various lathes, and are so common as not to require illustration or description. These nuts are opened and closed by moving a cam-plate, L.

The carriages may be drawn back by the weight H', cord $h'$, and pulley H, or by the rack and pinion J J' and hand-wheel J$^2$.

It is generally desirable that lathes of this kind be provided with means whereby the work of turning may be automatically stopped at any given point.

In turning wringer-roller shafts where one end has to be turned off much more than the other it is desirable that one spindle, C, be checked in its advance before the other.

In my device I have provided means for effecting the above results as follows: Each carriage is provided with the following devices: a cam-plate, L, has slots $l'$ in the position to serve as cams, and pins $l$, extending from the clamp-nut on the screw I I', rest in these slots. Therefore as the cam-plates are turned the nuts are opened or closed, as desired. On the left of Fig. 1 and in Fig. 5 these cam-plates are clearly shown. The position they there occupy is that which they occupy when the nut below is closed. The cam-plates may be turned by the lever $l^2$ or by a spring, L', which will, however, only turn it in one direction— viz., to open the nut. A catch and trigger, $l^3$ and O, hold the cam-plate in the position shown against the action of the spring L'. When the trigger is disengaged the spring will pull the cam-plate around, so as to open the nut below, and thus stop the advance of the carriage.

The devices for disengaging the trigger are as follows: On the sides of the clamp-block facing the carriages are placed gage-screws G, which may be screwed in and out, as desired, leaving more or less of their length exposed. On the carriages are rods N N, which are so placed as to come in contact, respectively, with the ends of the gage-screws G G whenever the carriages are sufficiently advanced toward the clamp-block. The rods N connect with levers n, and when moved backward so as to hit against the gage-screws will disengage the trigger O, and thereby allow the clamp-nuts, with which they are respectively connected, to be opened. It will therefore be seen that if the gage-screw on one side of the block is so adjusted as to extend farther from the block than the other the rod N on the carriage approaching it will be in contact therewith before the like rod on the other carriage is in contact with the screw on the other side of the block, and hence that carriage will be thrown out of gear and stopped before the other carriage is, and consequently the blank on that side will be turned up a less distance than at the other end. The triggers may, therefore, by means of the gage-screws, be disengaged together at any point, or one before the other at any point desired. When the article to be turned requires the same amount of turning at each end no time is lost by either head; but when one end requires more turning than the other one head has to lose the time occupied by the other in doing its extra work. By constructing the machine as shown in Fig. 3 this loss is avoided, for the machine first turns the opposite ends of two blanks one length; then when the blanks are reversed it may be set to turn their remaining ends a different length, and both cutters are at work all the time.

The devices for clamping the blank or blanks are, as shown, slightly different in the two forms of machine. In the style of machine shown in Figs. 1 and 2 the clamp is adapted for clamping only one blank, while in Figs. 3 and 6 the clamp shown is adapted for clamping two blanks. In each case there is a clamping-block, E, and a movable cap or jaw, E', and also a clamping-screw, F f.

In the device shown in Figs. 1 and 2 the cap or jaw E' is hinged to the block E, and when not engaged by the screw device can be thrown back so that the blank can be easily removed. The screw is also hinged, as at f'', on the block E, and when in a vertical position, which it occupies when clamping down the jaw, it lies in a notch in the side of the jaw E'. The nut is in the hub of the hand-wheel F. To raise the jaw the hand-wheel is turned up so as to allow the screw f to tilt over out of the notch in the plate E'. In Fig. 3 the jaw is raised and lowered by the screw like an ordinary press.

What I claim as new is—

1. In a turning-lathe, the combination, substantially as described, of the following elements: a revolving hollow cutter-head and hollow spindle bearing said cutter-head, a movable carriage sustaining said cutter-head and its spindle or shaft, feeding mechanism, substantially as described, for automatically moving said carriage toward the object to be turned, and a trigger device, spring, and cam-plate, substantially as described, for automatically throwing said carriage out of gear with the mechanism which actuates the same at any point desired.

2. In a turning-lathe, the combination, substantially as described, of the following elements: a central clamping-block for holding the blank to be turned, a movable carriage on each side of said clamping device, a revolving hollow spindle and hollow cutter-head on each of said carriages, feeding mechanism, substantially as described, for advancing said carriages simultaneously toward the clamping-block while the cutter-head is in motion, and trigger, spring, and cam-plate, substantially as described, for automatically throwing said carriages out of gear with their actuating mechanism, either simultaneously or one before the other, as desired.

3. In a turning-lathe, the combination, substantially as described, of the following elements: a central clamping-block, E, having a movable clamping-plate, E', and clamping-screw, a movable carriage, B, with bearing-blocks B' on each side of said clamping-block, a revolving spindle, C, and cutter-head D, mounted on said carriages, and a screw-shaft, I I', for simultaneously advancing both of said carriages toward the clamping device while the cutter-heads and spindles are revolving.

4. In a turning-lathe, the combination, substantially as described, of the following elements: a central clamping-block, E, having a movable clamping-plate, E', and a clamping-screw, a movable carriage, B, with bearing-blocks B' on each side of said clamping-block, a revolving spindle and cutter-head, C D, mounted on said carriages, a screw-shaft, I I', for simultaneously advancing both of said carriages toward the clamping device while the cutter-head is revolving, and cam-plates L, springs L', trigger O, and catch l³, levers n, rods N, and gage-screws G, for automatically throwing said carriages, either singly or simultaneously, out of gear with their actuating mechanism.

In testimony that I claim the foregoing I have hereunto set my hand this 12th day of April, 1881.

THOMAS G. MORSE.

Witnesses:
JNO. K. HALLOK,
P. C. HEYDRICK.